July 7, 1925.
S. JAMES
POWER FACTOR INDICATOR
Filed Dec. 8, 1923
1,544,989
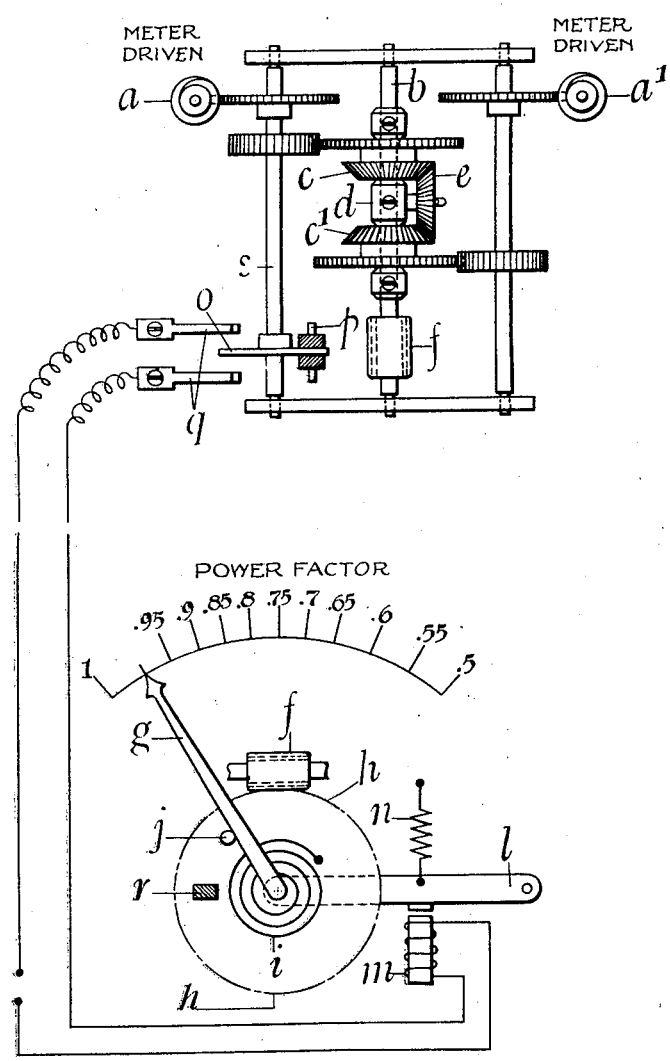
Inventor
S. James
By Marks & Clerk
Attys.

Patented July 7, 1925.

1,544,989

UNITED STATES PATENT OFFICE.

SAMUEL JAMES, OF BIRMINGHAM, ENGLAND, ASSIGNOR TO CHAMBERLAIN & HOOKHAM, LIMITED, OF BIRMINGHAM, ENGLAND.

POWER-FACTOR INDICATOR.

Application filed December 8, 1923. Serial No. 679,428.

*To all whom it may concern:*

Be it known that I, SAMUEL JAMES, a British subject, residing at 4 New Bartholomew Street, in the city of Birmingham, England, have invented certain new and useful Improvements Relating to Power-Factor Indicators, of which the following is a specification.

In a three-phase three-wire alternating electric current system, it is well known to employ two single phase meter elements to measure the useful energy passed through the system. Each meter element comprises a pressure coil and a current coil. Referring to the phases as 1, 2, 3, the current coils of the two meter elements are arranged, for example, in phases 1 and 3, and the pressure coils connected to those phases have a common connection with phase 2. When the load is balanced the energy readings of the two meter elements are sometimes used for calculating the average power factor. Thus for a given power factor the ratio of the two meter readings is constant so long as the load is balanced.

The object of the present invention is to enable the conditions above mentioned to be utilized in an instrument for indicating average power factor, thus eliminating the necessity for calculations which otherwise have to be made.

The invention comprises the operation of a movable index by both meter elements in such a manner that the motion of the index is related to the power factor, and the provision of means controlled by one of the said elements whereby the index actuating mechanism is periodically reset.

In particular the invention comprises the actuation of an index in one direction only by the two meter elements through a differential mechanism, and the employment of means under the control of one of the meters for periodically restoring to an initial position the means which impart motion to the index from the differential mechanism.

In the accompanying sheet of explanatory drawings:—

The figure is a diagram illustrating schematically one manner of carrying the invention into effect.

Referring to the diagram, a pair of worms $a$, $a'$ are respectively driven by a pair of meter elements. Freely mounted on a spindle $b$ are arranged a pair of sun pinions $c$, $c'$ forming part of a differential mechanism, and secured to the spindle is a carrier $d$ for a planet pinion $e$ which engages the sun pinions. The sun pinions are driven by the worms through gearing as illustrated in the diagram.

The spindle $b$ to which the planet pinion carrier is secured has attached to it a pinion or worm $f$ which can actuate a rotatable index $g$ through mechanism adapted to impart motion in one direction only. For example, the pinion or worm $f$ may engage a wheel $h$ which is controlled by a coiled spring $i$ and by means of a lateral projection $j$ abutting against the index or a part on the same is capable of moving the index. Reverse movement of the spring controlled wheel leaves the index stationary. The index is arranged in conjunction with a suitably graduated scale $k$.

The spring controlled wheel $h$ is mounted on a pivoted lever $l$ or is otherwise adapted to be moved into or out of engagement with the pinion or worm $f$, the wheel being held in engagement by a spring $n$ and moved out of engagement by an electromagnet $m$, which can be excited from any convenient source such as the supply system to which the instrument is connected. One of the worm driven spindles, for example, $s$ is provided with a disc $o$ carrying an insulated contact element $p$ which once in each revolution of the spindle, closes the electromagnet circuit by engaging the contact pieces $q$, and by causing the magnet to be excited withdraws the spring controlled wheel from its driving pinion. The spring controlled wheel under the action of its spring $i$ then returns to its zero or initial position (determined by abutment of the projection $j$ on the stop $r$), leaving the index standing, and after the magnet circuit has been re-opened the said wheel is allowed to re-engage the pinion $f$ by the spring $n$.

When two single phase watt hour meters are connected in a three-phase circuit for measuring a three-phase load according to the well known two watt meter method both meters will run at the same speed if the load is balanced and non-inductive. If the load becomes inductive but still remains balanced one meter will run faster than the other, the relative speeds varying according to the power factor. When the power factor falls to 0.5 the slower moving meter will stop, and for power factors below 0.5 this latter meter will run in the reverse direction. It is necessary to observe when connecting up the meter elements that the meter which drives the contact making device is the one which will run the faster on a balanced inductive load. The periodic resetting of the index actuating mechanism occurs after each completion of a predetermined number of revolutions of the worm $a$. Consequently the movement of the index during the interval between two successive operations of the resetting mechanism can be used as a measure of the average power factor during that interval. By suitably calibrating the scale $k$ the index therefore indicates average power factor, and as the index is moved only in the one direction by the mechanism, the position occupied by the index at any time indicates the minimum average power factor reached since the previous manual setting of the index.

Having thus described my invention, what I claim as new and desire to secure by Letters Patent is:—

1. In apparatus for indicating average power factor in a three phase three wire alternating current system operating with a balanced load, the combination comprising two single phase energy meters, an index, index actuating mechanism receiving motion from both meters and adapted to impart motion to the index in one direction only, and means under the control of one of the meters for returning the said mechanism periodically to its initial position, substantially as described.

2. In apparatus for indicating average power factor in a three phase three wire alternating current system operating with a balanced load, the combination comprising two single phase energy meters, differential mechanism actuated by both meters, a manually operable index, mutually disengageable wheels for transmitting motion in one direction only from the differential mechanism to the index, a spring in conjunction with one of said wheels, and electromagnetic means under the control of one of the meters for disengaging said wheels and enabling one of them to be returned to its initial position by the spring, substantially as described.

In testimony whereof I have signed my name to this specification.

SAMUEL JAMES.